US010633824B2

(12) United States Patent
Bruyere et al.

(10) Patent No.: US 10,633,824 B2
(45) Date of Patent: Apr. 28, 2020

(54) CONTROL METHOD FOR CONTROLLING A MOVABLE MEMBER OF AN EXCAVATOR AND EXCAVATOR COMPRISING A CONTROL UNIT IMPLEMENTING SUCH A CONTROL METHOD

(71) Applicant: VOLVO CONSTRUCTION EQUIPMENT AB, Eskilstuna (SE)

(72) Inventors: Lilian Bruyere, Belley (FR); Ahcène Nedjimi, Lyons (FR); François Savoye, Miribel (FR); Roger Caillieret, Brens (FR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 174 days.

(21) Appl. No.: 15/563,629

(22) PCT Filed: Apr. 3, 2015

(86) PCT No.: PCT/IB2015/000816
§ 371 (c)(1),
(2) Date: Oct. 2, 2017

(87) PCT Pub. No.: WO2016/156910
PCT Pub. Date: Oct. 6, 2016

(65) Prior Publication Data
US 2018/0072281 A1      Mar. 15, 2018

(51) Int. Cl.
*E02F 9/20*    (2006.01)
*E02F 9/22*    (2006.01)
(Continued)

(52) U.S. Cl.
CPC .......... *E02F 9/2033* (2013.01); *B66C 13/105* (2013.01); *B66C 13/30* (2013.01);
(Continued)

(58) Field of Classification Search
CPC ..... E02F 9/2033; E02F 9/2221; E02F 9/2029; E02F 9/2095; E02F 3/425; E02F 9/2083; E02F 9/128; B66C 13/30; B66C 13/105
See application file for complete search history.

(56) References Cited

U.S. PATENT DOCUMENTS 3,971,971 A * 7/1976 Wycoff ............... B66C 3/20
                                                318/743
7,067,999 B2 * 6/2006 Sugano et al. ....... E02F 9/128
                                                318/372
(Continued)

FOREIGN PATENT DOCUMENTS

EP    2284323 A1    2/2011
JP    S63300131 A   12/1988

OTHER PUBLICATIONS

International Search Report (dated Jan. 22, 2016) for corresponding International App. PCT/IB2015/000816.
WO2013114451A1 (Aug. 8, 2013) (Abstract) Hitachi, Ltd.

*Primary Examiner* — Dale W Hilgendorf
(74) *Attorney, Agent, or Firm* — Sage Patent Group (57) ABSTRACT

A control method controls a movable member of an excavator including a movable member holding a load, an actuator with electric motor and static brake, a control unit and a motion sensor unit. The static brake and electric motor generate respectively an upper threshold brake force and an upper threshold motor force. An immobilization operation provides that the static brake generates the upper threshold brake force and the electric motor is stopped. A slippage detection operation provides that the control unit detects whether an electric actuator is moving despite the static brake. If the electric actuator is moving, a motor energizing operation provides that the electric motor generates a motor force equal or superior to upper threshold brake force in a direction opposite to the slippage direction. After energizing (Continued)

the motor, a brake release operation provides that the control unit releases the static brake.

16 Claims, 3 Drawing Sheets

(51) Int. Cl.
    *B66C 13/10*     (2006.01)
    *B66C 13/30*     (2006.01)
    *E02F 3/42*     (2006.01)
    *E02F 9/12*     (2006.01)

(52) U.S. Cl.
    CPC ............ *E02F 3/425* (2013.01); *E02F 9/2029* (2013.01); *E02F 9/2095* (2013.01); *E02F 9/2221* (2013.01); *E02F 9/128* (2013.01); *E02F 9/2083* (2013.01)

(56) References Cited

U.S. PATENT DOCUMENTS

| | | | | |
|---|---|---|---|---|
| 7,276,669 | B2* | 10/2007 | Dahl et al. ................ | E02F 9/24 701/50 |
| 7,345,441 | B2* | 3/2008 | Yoshimatsu ............ | E02F 9/128 318/372 |
| 8,651,301 | B2* | 2/2014 | Kiova et al. .......... | B66C 13/105 212/284 |
| 10,150,653 | B2* | 12/2018 | Kyllingstad ............ | B66C 13/06 |
| 2005/0253542 | A1 | 11/2005 | Sugano et al. | |
| 2012/0101693 | A1* | 4/2012 | Taylor ................... | E02F 9/2033 701/50 |
| 2016/0347593 | A1* | 12/2016 | Golder ..................... | B66D 3/22 |

* cited by examiner

CONTROL METHOD FOR CONTROLLING A MOVABLE MEMBER OF AN EXCAVATOR AND EXCAVATOR COMPRISING A CONTROL UNIT IMPLEMENTING SUCH A CONTROL METHOD

BACKGROUND AND SUMMARY

The present invention relates to a control method for controlling a movable member of an excavator. Besides, the present invention relates to an excavator comprising a control unit implementing such a control method.

The invention can be applied in construction equipment machines, such as mechanical shovels or drillers and any other type of excavator. Such excavator may be a tracked excavator comprising either a caterpillar track or wheels, and a cantilever member coupled to a rotating platform mounted on the caterpillar track.

The invention can also be applied to wheeled excavators and or to backhoe loaders. Although the invention will be described with respect to a mechanical shovel, the invention is not restricted to this particular construction equipment, but may also be used in other construction equipment machines.

WO13114451A1 discloses an excavator including several movable members and several electric actuators to actuate said movable members, several static brakes to lock said electric actuators, a command device to receive commands from an operator and a control unit to control said electric actuators and said static brakes.

The excavator of WO113114451A1 comprises a movable member for holding loads in service, an electric actuator with an electric motor, a brake for braking the electric motor in case of a risk of collision, and a motion sensor for delivering motion signals to the control unit.

However, in the excavator of WO13114451A1, the electric motor is continuously energized in order to immobilize the electric actuators thus inducing expensive electrical power consumption even during idle periods. Besides, the brake release causes some backlash in the electric actuator, which decreases the operator's comfort and may reduce the service life of some components of the excavator.

It therefore appears that, from several standpoints, there is room for improvement in the control methods for controlling a movable member of an excavator and in the excavator including a control unit implementing such a control method.

It is desirable to provide a control method which reduces or avoids the risk of backlash when the brake is released, while minimizing the electrical power consumption.

According to one aspect of the invention, a control method for controlling a movable member of an excavator includes a step of:

providing an excavator including at least:

a movable member configured to hold a load when said excavator is in service, an electric actuator configured to actuate said movable member, said electric actuator comprising: i) an electric motor which is reversible and which is configured to apply a motor force on said electric actuator, and ii) a static brake configured to generate a brake force so as to brake said electric actuator, a control unit configured to control said electric motor and said static brake, and a motion sensor unit configured to detect a motion of said electric actuator and to send motion signals to said control unit.

Furthermore, said static brake is configured to generate an upper threshold brake force and said electric motor is configured to generate an upper threshold motor force, said upper threshold brake force being inferior to said upper threshold motor force.

The control method includes at least:

performing an immobilization step wherein said control unit controls said static brake to generate said upper threshold brake force, performing a slippage detection step wherein said control unit checks said motion signals in order to detect whether said electric actuator is moving in a slippage direction despite said static brake generating said upper threshold brake force, in case said control unit detects that said electric actuator is moving in said slippage direction, performing a motor energizing step wherein said control unit controls the power supply to said electric motor so that said electric motor generates a motor force substantially equal or superior to said upper threshold brake force in a direction opposite to said slippage direction, and after start of said motor energizing step and in case said electric motor generates a non null motor force, performing a brake release step wherein said control unit releases at least partially said static brake.

Thus, such a control method allows a smooth release of the static brake even though the electric actuator carries a high load. Conversely, such a control method avoids the backlash when stopping a slippage of the electric actuator carrying a high load. Indeed, the electric motor is energized up to the upper threshold motor force before the static brake is released. Hence when the static brake is released, the electric motor already carries the load and thus substantially holds in place the electric actuator.

Besides, such a control method spares electrical power, since the electric motor can be shutdown when the static brake suffices to hold a static load, hence most of the time. Thus, such a control method permits to give in smoothly to high, excessive loads while the static brake might fail to stop the load (slippage) and hence to smoothly give in to the load.

By the provision of such an excavator arm, an advantage of such a control method is the reduction of the risk of backlash when the static brake is released, while minimizing the electrical power consumption, as compared to the excavator of WO13114451A1. Indeed, the electric motor can remain idle over long periods, which permits to reduce electric power consumption. Once the electric motor gets energized, it can hold the loads in lieu of the static brake.

Throughout the present application, the term "motion sensor unit" defines a device configured to electronically monitor the motions or movements of or within a component, for instance of a movable member. A motion sensor generally produces an electrical signal that varies as said component moves. Thus, such a motion sensor unit allows the control unit to monitor the motions of one or several electric actuator(s).

Throughout the present patent application, the term "detect a motion of said electric actuator" involves at least detecting a change in a relative position of two parts of the electric actuator, and detecting the direction of this change in a relative position.

The motion sensor unit may include any kind of motion sensor so as to detect any non null speed or any motion, hence any change in position, of said electric actuator. For instance, the motion sensor unit may include at least one position sensor, an acceleration sensor or a speed or velocity sensor. For instance the motion sensor unit may include a rotary encoder or shaft encoder or any other electro-mechanical device converting an angular position of the rotary motor shaft into an analogue value or digital code. The motion sensor unit may include a velocity sensor, for instance an inductive sensor.

Throughout the present application, the term "slippage" refers to a motion of the electric actuator despite the static brake generating the upper threshold brake force.

According to a variant, said control unit is an electronic control unit.

According to a variant, said control unit comprises a memory storing at least a dataset containing data identifying every electric actuator belonging to said at least one actuating set. Thus, such a memory permit to define the actuating sets prior to using the excavator, for instance depending upon the combined motions which will most likely be commanded by the operator.

According to a variant said static brake may be configured to generate a brake force on said electric motor. Alternatively, said static brake may be configured to generate a brake force on an intermediate component, which in turn transmits the brake force to said electric motor.

The control unit may include a variable-frequency drive configured to control at least one electric motor. Besides, the control unit may be configured to receive motion signals from said motion sensor unit in order to assess the state of the electric actuator, in particular to assess whether said electric actuator is immobile or still moving.

During the immobilization step, the control unit may completely stop the power supply to the electric motor. Alternatively, during the immobilization step, the control unit may maintain a predetermined power supply to the electric motor, for instance a low power supply.

During said brake release step, said control unit may totally release the static brake, such that the static brake generates no brake force. Alternatively, during said release step, the control unit may partially release the static brake, such that the static brake generates a low brake force.

According to an embodiment, during said motor energizing step, said control unit controls the power supply to said electric motor so that said electric motor generates a motor force superior to 80%, for instance superior to 100%, of said upper threshold brake force.

Thus, such a control method allows a very smooth release of the static brake even though the electric actuator carries a high load.

According to an embodiment, the control method further includes at least:

after completion of said brake release step, performing a motion detection step wherein said control unit checks said motion signals in order to detect whether said electric actuator keeps moving in said slippage direction, in case said electric actuator is moving in said slippage direction, performing a check step wherein said control unit checks whether said electric motor is generating a motor force equal or superior to said upper threshold motor force, and in case said electric motor is generating a motor force equal or superior to said upper threshold motor force, performing an overload relief step wherein said control unit controls said electric motor to generate said upper threshold motor force.

Thanks to this aspect of the invention, the risk of damaging the mechanical parts of the movable member are reduced or avoided.

According to an embodiment, the control method further includes:

in case said electric motor is generating a motor force inferior to said upper threshold motor force, performing an incremental step wherein said control unit increases said motor force, performing a loop step wherein said motion detection step, said overload check step, said overload relief step and/or said incremental step are repeated until said electric actuator remains motionless during a predetermined period, and in case said electric actuator has stopped moving during said predetermined period, performing said immobilization step.

The loop step can be repeated until the movable member is motionless. Then, the control unit controls the electrical motor so that an acceptable torque maintains the load motionless. If the torque is superior to the acceptable torque then motion will occur while torque is limited. Once motion subsides and torque remains acceptable then the immobilization step takes place.

Thus, such a control method allows limiting the slippage of the static brake while allowing slippage of the movable member via the electrical motor. Hence, such a control method allows using a static brake to brake the electric motor. Indeed, in case the movable member is subjected to an overload, namely a load superior to said upper threshold motor force, such steps allow to smoothly give in to an overload superseding the upper threshold motor force. Alternatively, such steps allow taking over control of a load larger than said upper threshold brake force but inferior to said upper threshold motor force, hence inferior to an overload.

Alternatively to the previous embodiment, when the load on said electric actuator increases, said control unit may operate another actuator in order to stop the slippage of said electric actuator.

According to an embodiment, said control unit further comprises a timer for counting said predetermined period, and wherein said predetermined period ranges from 1 s to 5 s.

Thus, such a predetermined period enhances the safety of the excavator, because it ensures that the movable member is completely stopped, hence not slipping, either by the motor force or the brake force.

According to an embodiment, wherein said control unit performs said motor energizing step in case said motion signals present a predetermined condition, for instance in case an amplitude of said motion signals supersedes a predetermined motion threshold.

Thus, unnecessary energizing steps are avoided, for instance when vibrations occur that generate small motion signals or noise.

According to a variant, the predetermined condition may be defined as a range of slippage amplitude. For instance, in case the electric motor has a reduction ratio of 25, the slippage amplitude may range from 37.5 degrees to 75 degrees. Alternatively, a low-pass filter may be applied on the motion signals.

According to an embodiment, during said motor energizing step, said control unit controls the power supply to said electric motor so that said electric motor generates a motor force ranging between 100% and 120% of said upper threshold brake force.

Thus, such a range allows the motor force to be superior to the upper threshold brake force.

According to an embodiment, said upper threshold motor force ranges between 100% and 300% of said upper threshold brake force.

Thus, such a range allows the upper threshold motor force to hold loads despite slippage occurring at the static brake.

According to an embodiment, said upper threshold brake force can range between 33% and 99%, for instance between 66% and 98%, of the maximum brake force. Throughout the present application, the term "maximum brake force" refers to the highest possible brake force that the static brake can generate.

According to a variant, said upper threshold motor force can range between 33% and 99%, for instance between 66% and 98%, of the maximum motor force.

Throughout the present application, the term "maximum motor force" refers to the highest possible motor force that the electric motor can generate.

According to an embodiment, said upper threshold brake force corresponds to a predetermined overload limit.

Thus, such an upper threshold brake force can hold any load applied during normal service conditions of the excavator.

According to an embodiment, said predetermined overload limit is set as a function of the mechanical strength of said movable member.

Throughout the present application, the term "mechanical strength of the movable member" refers to the yield strength of the movable member, hence to the force that would start the plastic deformation of the movable member.

According to an embodiment, said predetermined overload limit ranges between 25% and 80% of the mechanical strength of said movable member.

Thus, such a predetermined overload limit ensures that the control unit will give in to an overload without risking to break the structure of the movable member.

According to an embodiment, said movable member is selected from the group consisting of a tool configured to work on a site, an arm configured to move said tool, a boom configured to move said arm, a swing member configured to swing said boom, a drive member configured to displace said swing member with respect to a site ground and an offset member.

According to an embodiment, said motion sensor unit includes a motion sensor selected from the group consisting of an encoder coupled with said electric actuator, a motion detector and a system comprising at least two position sensors or two distant elements which are configured to cooperate in order to generate motion signals.

Thus, such a motion sensor unit provides the control unit with frequent, accurate motion signals.

According to an embodiment, said electric actuator is selected in the group consisting of linear electric actuators and rotational electric actuators.

According to a variant, said electric actuator can be a linear electric actuator and further comprise a converter configured to convert rotary motion into linear motion. A linear electric actuator usually comprises a linear actuating rod, which is linearly movable. The electric motor can apply a driving torque on the linear actuating rod, in which case the motor force is a motor torque. Likewise, static brake can usually apply a brake torque on the linearly movable rod, in which case the brake force is a brake torque.

According to a variant, said electric actuator can comprise a reversible mechanical linear actuator. For instance said electric actuator can comprise a ball screw, a roller screw or a buttress thread screw, the screw imparting translation to a linear actuator rod by a nut.

According to a variant, said electric actuator can further include an actuating device and a gearbox configured to transmit power from said electric motor to said actuating device.

According to another aspect of the invention, an excavator includes at least:

a movable member configured to hold a load when said excavator is in service, an electric actuator configured to actuate said movable member, said electric actuator comprising: i) an electric motor which is reversible and which is configured to apply a motor force on said electric actuator, and ii) a static brake configured to generate a brake force so as to brake said electric actuator, a control unit configured to control said electric motor and said static brake, a motion sensor unit configured to detect a motion of said electric actuator and to send motion signals to said control unit, wherein said static brake is configured to generate an upper threshold brake force and said electric motor is configured to generate an upper threshold motor force, said upper threshold brake force being inferior to said upper threshold motor force, and wherein said control unit is further configured to:

perform an immobilization step wherein said control unit controls said static brake to generate said upper threshold brake force, perform a slippage detection step wherein said control unit checks said motion signals in order to detect whether said electric actuator is moving in a slippage direction despite said static brake generating said upper threshold brake force, in case said control unit detects that said electric actuator is moving in said slippage direction, perform a motor energizing step wherein said control unit controls the power supply to said electric motor so that said electric motor generates a motor force substantially equal or superior to said upper threshold brake force in a direction opposite to said slippage direction, and after start of said motor energizing step and in case said electric motor generates a non null motor force, perform a brake release step wherein said control unit releases at least partially said static brake.

For instance, said static brake can be gradually and totally released during the brake release step.

Within the scope of the present invention, the aforementioned embodiments and variants can be considered either in isolation or in any technically possible combination.

BRIEF DESCRIPTION OF THE DRAWINGS

The features and advantages of the present invention will also appear upon reading the following description in view of the appended drawings, which represent, as non-limiting examples, an embodiment of an excavator arm according to the invention.

The following detailed description of several embodiments of the invention is better understood when read in conjunction with the appended drawings. However, the invention is not limited to the specific embodiments disclosed herewith.

DETAILED DESCRIPTION

Figure 1:
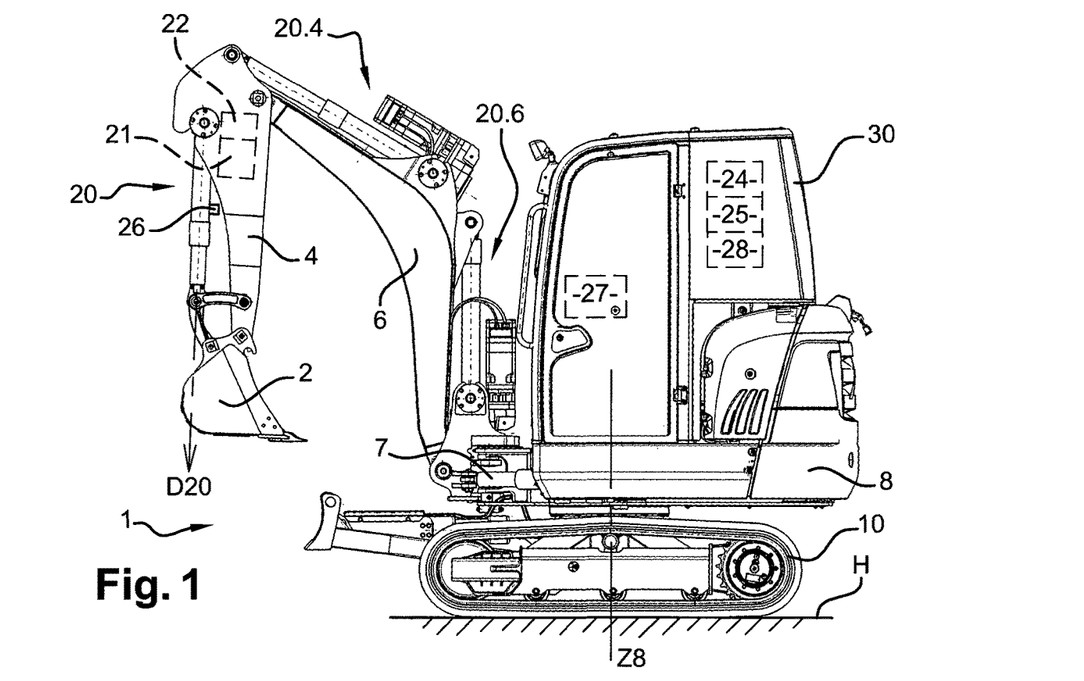
FIG. 1 is a schematic side view of an excavator according to one aspect of the invention.

FIG. 1 illustrates an excavator 1 according to one aspect of the invention. In the example of FIG. 1, excavator 1 is a mechanical shovel. Excavator 1 includes several movable members, in particular:

a tool 2 configured to work on a site,
an arm 4 configured to move tool 2,
a boom 6 configured to move arm 4,
a swing member 8 configured to swing boom 6,
an offset member 7, and
a drive member 10 configured to displace swing member 8 with respect to a site ground.

Each movable member 2, 4, 6, 8, 10 is configured to bear and move a respective part of excavator 1. When excavator 1 is in service, tool 2 moves itself, arm 4 moves tool 2, boom 6 moves arm 4, swing member 8 moves boom 6 and drive member 10 moves swing member 8. When excavator 1 is in service, every movable member, for instance tool 2, is likely to sustain a load.

Tool 2 and arm 4 can be linked by an articulation, e.g. a hinge, which enables at least a rotation of tool 2 relative to arm 4. Arm 4 and boom 6 can be linked by an articulation, e.g. a hinge, which enables at least a rotation of arm 4 relative to boom 6. Boom 6 and swing member 8 can be linked by an articulation, e.g. a hinge, which enables at least a rotation of boom 6 relative to swing member 8.

Swing member 8 and drive member 10 can be linked by an articulation, e.g. a hinge, which enables at least a rotation of swing member 8 relative to drive member 10. Swing member 8 is configured to swing boom 6 about a swing axis Z8 which is substantially vertical when excavator 1 lies on a horizontal site H.

Swing member 8 can comprise a rotating platform bearing a cab 30 for accommodating an operator. Cab 30 is configured to accommodate the operator and a command device 27 configured to receive commands from the operator. Command device 27 can for instance comprise a joystick or handle remotely connected to the control unit 24. Command device 27 is configured to generate command signals based on said commands from the operator. The command signals can be transmitted from command device 27 to control unit 24 either by a wire or wirelessly by radiowaves.

Drive member 10 can comprise two caterpillar tracks for driving excavator 1. Alternatively or supplementary to caterpillar tracks, drive member can comprise wheels.

Each movable member 2, 4, 6, 8, 10 is configured to hold a load when the excavator 1 is in service. For each movable member 2, 4, 6, 8, 10 to move a respective part of excavator 1, excavator 1 includes a respective a motion sensor unit and a respective electric actuator comprising a reversible electric motor and a static brake.

Figure 2:
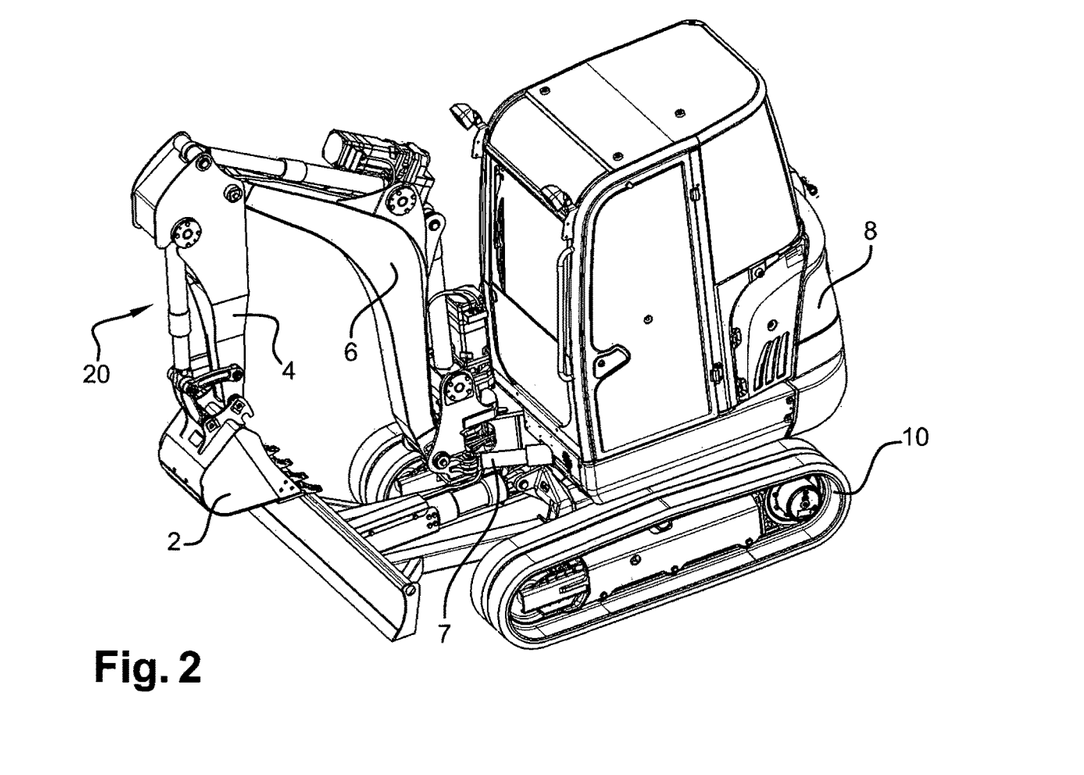
FIG. 2 is a schematic side view of an electric actuator belonging to the excavator of FIG. 1.

FIG. 2 illustrates a tool electric actuator 20 configured to actuate the tool 2. Excavator 1 further comprises an electric actuator 20.4 to actuate arm 4 and an electric actuator 20.6 to actuate boom 6. Insofar as electric actuator 20.4 and electric actuator 20.6 are similar to tool electric actuator 20, the description of tool electric actuator 20 given hereafter can be transposed to electric actuator 20.4 and electric actuator 20.6.

Tool electric actuator 20 comprises an electric motor 21 and a static brake 22. Electric motor 21 is linear, reversible and is configured to generate a motor force or motor torque F21.20 (hereinafter referred to as a "motor force") on tool electric actuator 20. Static brake 22 is configured to generate a brake force or brake torque F22.21 (hereinafter referred to as a "brake force"), herein on the electric motor 21, so as to brake tool electric actuator 20.

Tool electric actuator 20 can have two telescopic parts which are mounted in a telescopic arrangement and which may be displaced lengthwise by electric motor 21 so as to vary the length of tool electric actuator 20. A mechanism links the two telescopic parts of the tool electric actuator 20 in order to convert a rotary motion of the electric motor in a linear relative displacement of the two telescopic parts. Such a mechanism can be of the roller screw type.

Figure 3:
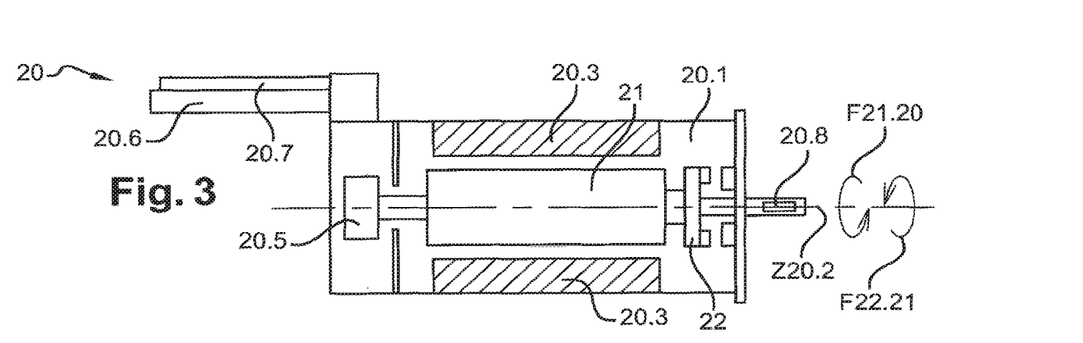
FIG. 3 is a schematic sectional view of an electric actuator belonging to the excavator of FIG. 1.

FIG. 3 illustrates the tool electric actuator 20. Tool electric actuator 20 includes a generally cylindrical actuator body 20.1, the electric motor 21 with its magnetic coils 20.3, the static brake 22 and a position sensor 20.5. Position sensor 20.5 may be of the encoder type.

Power supply to electric motor 21 is performed through a power cable 20.6. Electric motor 21 rotates around a rotation axis Z20.2.

In service, control unit 24 sends its control signals to tool electric actuator 20 via a signal cable 20.7. Likewise, position sensor 20.5 sends its motion signals to control unit 24 via signal cable 20.7.

In service, the output torque of rotational electric motor 20.2 moves a screw rod 20.8. Tool electric actuator 20 actuates the screw rod 20.8 which delivers mechanical power to the tool 2.

Static brake 22 has a disk which can rotate with the electric motor 21 and which bears braking pads configured to rub against a friction surface attached to actuator body 20.1. Alternatively, a static brake could be located on the electric motor, on a gear or on the screw rod 20.8.

Electric power can be supplied to the electric motors by a non illustrated electric accumulator which can for instance be mounted on a chassis of excavator 1. The electric accumulator can store 15 kWh of energy and supply current at a 600 V tension. A DC/DC converter can supply each electric motor with current at a suitable tension. Electric motors in turn supply mechanical power to the electric actuator.

Excavator 1 further comprises a control unit 24 configured to control electric motor 21 and static brake 22. Besides, control unit 24 is herein configured to control tool electric actuator 20. Control unit can be an electronic control unit. Control unit 24 can comprise a memory 25 storing at least a dataset containing data individually identifying every electric actuator (20, 20.4, 20.6 etc.) belonging to excavator 1.

Moreover, tool electric actuator 20 comprises a motion sensor unit 26 arranged to detect the motion of tool electric actuator 20 and to send motion signals to control unit 24. The motion sensor unit can include a position sensor, an acceleration sensor or a velocity sensor. For instance, motion sensor unit 26 can include the position sensor 20.5 (rotary encoder) coupled with tool electric actuator 20.

Static brake 22 is configured to generate an upper threshold brake force. Tool electric motor 21 is configured to generate an upper threshold motor force. The upper threshold brake force is inferior to, hence smaller than, the upper threshold motor force.

For instance, the upper threshold motor force can be about 130% of the upper threshold brake force. Besides, the upper threshold brake force can be about 90% of the maximum brake force. The upper threshold motor force can be about 80% of the maximum motor force.

Figure 4:
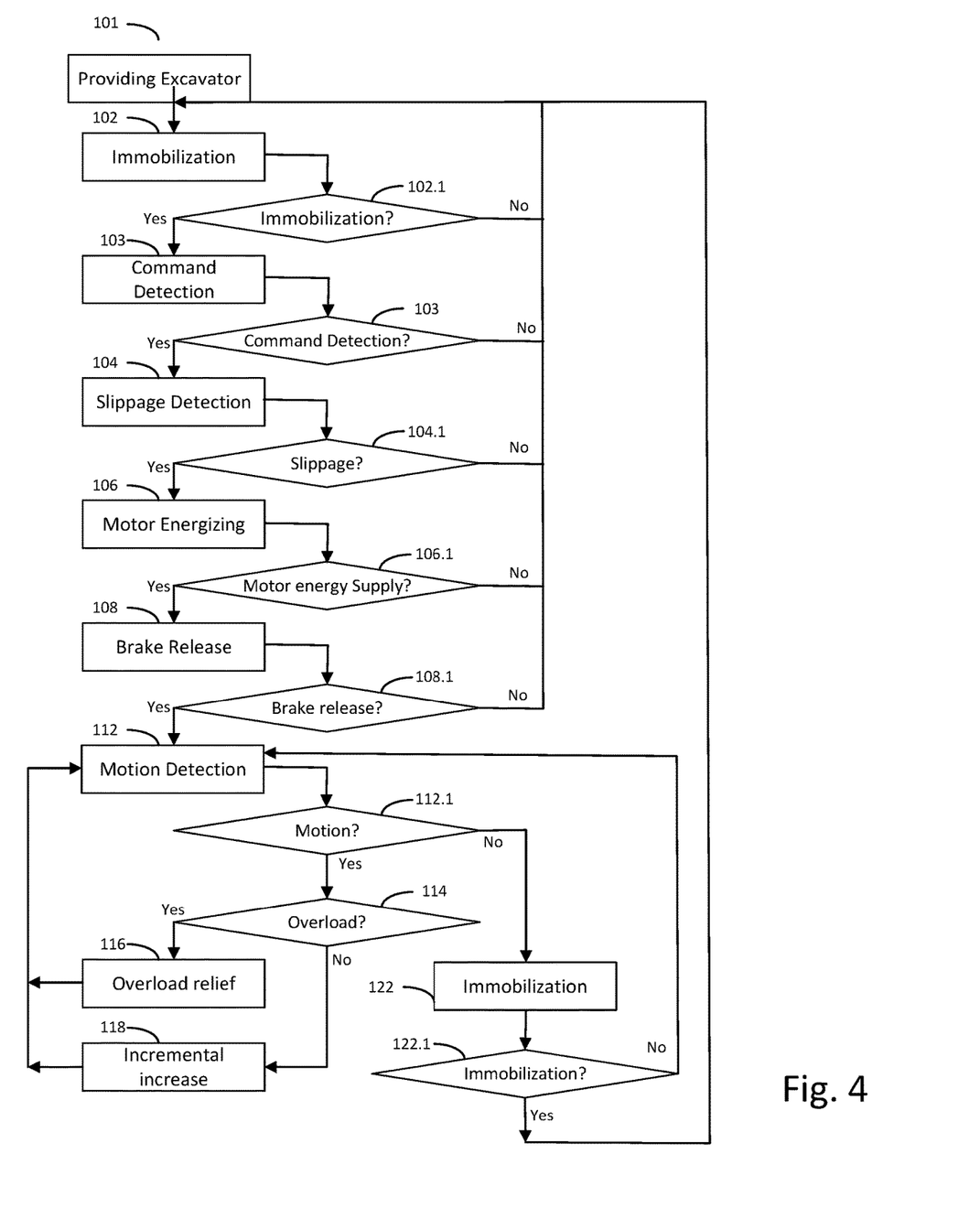
FIG. 4 is a flow chart illustrating a control method according to one aspect of the invention for controlling a movable member of the excavator of FIG. 1.

FIG. 4 illustrates a control method 100 according to another aspect of the invention, for controlling excavator 1 when it is in service. An initial step of control method 100 is a providing step 101 for providing excavator 1.

Control method 100 performs an immobilization step 102 wherein control unit 24 controls said static brake to generate said upper threshold brake force and wherein said control unit substantially stops the power supply to said electric motor.

Then, control method 100 performs an immobilization check step 102.1 wherein control unit 24 checks whether static brake 22 is currently active.

In case (yes) static brake 22 is currently active, control method 100 performs a command detection step 103 wherein control unit 24 checks whether the operator of the excavator 1 has not sent a command to request a motion of tool 2.

In case (yes) the operator of the excavator 1 has not sent such a command, control method 100 performs a slippage detection step 104 wherein the control unit 24 checks the motion signals in order to detect whether tool electric actuator 20 is moving in a slippage direction D20 despite the static brake 22 generating the upper threshold brake force.

Control unit 24 thus performs a slippage check step 104.1 wherein control unit 24 checks whether a motion of tool electric actuator 20 is occurring.

In case (yes) the control unit 24 detects that tool electric actuator 20 is moving in the slippage direction D20, control method 100 performs a motor energizing step 106 wherein the control unit 24 controls the power supply to the electric motor 21 so that electric motor 21 generates a motor force substantially equal or superior to upper threshold brake force in a direction opposite to the slippage direction D20. In other words, this motor force works in a counter-slippage direction.

Control unit 24 then performs a motor energy supply check step 106.1 wherein control unit 24 checks whether electric motor 21 is currently energized.

After start of the motor energizing step 106 and in case said electric motor 21 generates a non null motor force, control method 100 further includes a brake release step 108 wherein the control unit 24 releases at least partially the static brake 22. During the brake release step 108, the control unit 24 performs a gradual release of the static brake 22 down to zero.

Control unit 24 then performs a brake release check step 108.1 wherein control unit 24 checks whether static brake 22 is currently released.

Besides, during the motor energizing step 106, the control unit 24 can control the power supply to the electric motor 21 so that electric motor 21 generates a motor force that can be of about 110% of the upper threshold brake force.

Furthermore, in case (yes) the static brake 22 is currently released, control method 100 may perform a motion detection step 112: After completion of the brake release step 108, the control unit 24 checks the motion signals, during a motion check step 112.1, in order to detect whether tool electric actuator 20 keeps moving in the slippage direction D20.

In case (yes) the tool electric actuator 20 is moving in the slippage direction D20, control method 100 may perform an overload check step 114 wherein the control unit 24 checks whether the electric motor 21 is generating a motor force substantially equal or superior to the upper threshold motor force.

In case (114: yes) the electric motor 21 is generating a motor force equal or superior to the upper threshold motor force, control method 100 may perform an overload relief step 116 wherein the control unit 24 controls electric motor 32 to generate the upper threshold motor force.

In other words, in such a case (114: yes) the movable member is subjected to an overload, namely a load superior to said upper threshold motor force. The overload relief step 116 limits the motor force to the upper threshold motor force. Hence the overload relief step 116 allows to smoothly giving in to the overload which supersedes the upper threshold motor force. Thus, the overload relief step 116 avoids the risks of breaking a structural component of the movable member, for instance arm 4.

In case (114: no) the electric motor 21 is generating a motor force inferior to the upper threshold motor force, control method 100 may perform an incremental step 118 wherein control unit 24 increases the motor force.

Control method 100 may further perform a loop step 120 wherein the motion detection step 112, the overload check step 114, the overload relief step 116 and/or the incremental step 118 are repeated until tool electric actuator 20 remains motionless during a predetermined period.

The control unit 24 can further comprise a timer 28 for counting the predetermined period. The predetermined period can last about 3 seconds.

Control method 100 may perform an immobilization check step 122 wherein control unit 24 checks whether tool electric actuator 20 remains motionless during the predetermined period.

In case (122: yes) tool electric actuator 20 has stopped moving during said predetermined period, control method 100 can perform the immobilization step 102. In cases (102.1: no), (103: no), (104.1: no), (106.1: no), and (108.1: no), control method 100 can also return to the immobilization step 102.

Instead, in case (122: no) tool electric actuator 20 keeps moving during said predetermined period, control method 100 can loop on motion detection step 112 onwards.

The upper threshold brake force can correspond to a predetermined overload limit. The predetermined overload limit can be set as a function of the mechanical strength of said movable member. The predetermined overload limit can be about 70% of the mechanical strength of the tool 2 as a movable member.

It is to be understood that the present invention is not limited to the embodiments described above and illustrated in the appended drawings. Instead, the skilled person will recognize that many changes and modifications may be made within the scope of the appended claims.

The invention claimed is:

1. A control method, for controlling a movable member of an excavator, the control method including a step of:
   providing the excavator including at least:
   the movable member configured to hold a load when the excavator is in service,
   an electric actuator configured to actuate the movable member, the electric actuator comprising: i) an electric motor which is reversible and which is configured to apply a motor force on the electric actuator, and ii) a static brake configured to generate a brake force so as to brake the electric actuator,
   a control unit configured to control, the electric motor and the static brake, and a motion sensor unit configured to detect a motion of the electric actuator and to send motion signals to the control unit, wherein the static brake is configured to generate an upper threshold brake force and the electric motor is configured to generate an upper threshold motor force, the upper threshold brake force being inferior to the upper threshold motor force, and wherein the control method includes at least:

performing an immobilization step wherein the control unit controls the static brake to generate the upper threshold brake force, performing a slippage detection step wherein the control unit checks the motion signals in order to detect whether the electric actuator is moving in a slippage direction despite the static brake generating the upper threshold brake force, in case the control unit detects that the electric actuator is moving in the slippage direction, performing a motor energizing step wherein the control unit controls a power supply to the electric motor so that the electric motor generates a motor force substantially equal or superior to the upper threshold brake force in a direction opposite to the slippage direction, and after start of the motor energizing step and in case the electric motor generates a non null motor force, performing a brake release step wherein the control unit releases at least partially the static brake.

2. The control method according to claim 1, wherein, during the motor energizing step, the control unit controls the power supply to the electric motor so that the electric motor generates a motor force that is superior to 80% to 100%, of the upper threshold brake force.

3. The control method according to claim 1, further including at least:

after completion of the brake release step, performing a motion detection step wherein the control unit checks the motion signals in order to detect whether the electric actuator keeps moving in the slippage direction, in case the electric actuator is moving in the slippage direction, performing a check step wherein the control unit checks whether the electric motor is generating a motor force equal or superior to the upper threshold motor force, and in case the electric motor is generating the motor force equal or superior to the upper threshold motor force, performing an overload relief step wherein the control unit controls the electric motor to generate the upper threshold motor force.

4. The control method according to claim 3, further including:

in case the electric motor is generating a motor force inferior to the upper threshold motor force, performing an incremental step wherein the control unit increases the motor force, performing a loop step wherein the motion detection step, an overload check step, the overload relief step and/or the incremental step are repeated until the electric actuator remains motionless during a predetermined period, and in case the electric actuator has stopped moving during the predetermined period, performing the immobilization step.

5. The control method according to claim 4, wherein the control unit further comprises a timer for counting the predetermined period, and wherein the predetermined period ranges from 1 s to 5 s.

6. The control method according to claim 1, wherein the control unit performs the motor energizing step in case the motion signals present a predetermined condition, for instance in case an amplitude of the motion signals supersedes a predetermined motion threshold.

7. The control method according to claim 1, wherein, during the motor energizing step, the control unit controls the power supply to the electric motor so that the electric motor generates a motor force ranging between 100% and 120% of the upper threshold brake force.

8. The control method according to claim 1, wherein the upper threshold motor force ranges between 100% and 300% of the upper threshold brake force.

9. The control method according to claim 1, wherein the upper threshold brake force can range between 33% and 99% of a maximum brake force.

10. The control method according to claim 1, wherein the upper threshold brake force corresponds to a predetermined overload limit.

11. The control method according to claim 10, wherein the predetermined overload limit is set as a function of the mechanical strength of the movable member.

12. The control method according to claim 11, wherein the predetermined overload limit ranges between 25% and 80% of the mechanical strength of the movable member.

13. The control method according to claim 1, wherein the movable member is selected from the group consisting of a tool configured to work on a site, an arm configured to move the tool, a boom configured to move the arm, a swing member configured to swing the boom, a drive member configured to displace the swing member with respect to a site ground and an offset member.

14. The control method according to claim 1, wherein the motion sensor unit includes a motion sensor selected from the group consisting of an encoder coupled with the electric actuator, a motion detector and a system comprising at least two position sensors which are configured to cooperate in order to generate motion signals.

15. The control method according to claim 1, wherein the electric actuator is selected in a group consisting of linear electric actuators and rotational electric actuators.

16. An excavator including at least:

a movable member configured to hold a load when the excavator is in service, an electric actuator configured to actuate the movable member, the electric actuator comprising: i) an electric motor which is reversible and which is configured to apply a motor force on the electric actuator, and ii) a static brake configured to generate a brake force so as to brake the electric actuator, a control unit configured to control the electric motor and the static brake, a motion sensor unit configured to detect a motion of the electric actuator and to send motion signals to the control unit, wherein the static brake is configured to generate an upper threshold brake force and the electric motor is configured to generate an upper threshold motor force, the upper threshold brake force being inferior to the upper threshold motor force, and wherein the control unit is further configured to:
perform an immobilization step wherein the control unit controls the static brake to generate the upper threshold brake force,
perform a slippage detection step wherein the control unit checks the motion signals in order to detect whether the electric actuator is moving in a slippage direction despite the static brake generating the upper threshold brake force,
in case the control unit detects that the electric actuator is moving in the slippage direction, perform a motor energizing step wherein the control unit controls a power supply to the electric motor so that the electric motor generates a motor force substantially equal or superior to the upper threshold brake force in a direction opposite to the slippage direction, and
after start of the motor energizing step and in case the electric motor generates a non null motor force, perform a brake release step wherein the control unit releases at least partially the static brake.

* * * * *